United States Patent [19]
Rey

[11] Patent Number: 5,841,351
[45] Date of Patent: Nov. 24, 1998

[54] AUTOMATED SYSTEM FOR STORING CYCLES, IN PARTICULAR BICYCLES

[75] Inventor: Pascal Rey, Brussels, Belgium

[73] Assignee: More Group Belgium S.A., Brussels, Belgium

[21] Appl. No.: 916,020

[22] Filed: Aug. 21, 1997

[30] Foreign Application Priority Data

Apr. 30, 1997 [EP] European Pat. Off. ........... 97107156.8

[51] Int. Cl.$^6$ .................................................. G08B 13/14
[52] U.S. Cl. ...................... 340/572; 340/432; 340/427; 340/932.2; 307/10.5
[58] Field of Search ............................... 340/432, 932.2, 340/902.2, 427, 572; 307/10.5; 235/382; 70/235

[56] References Cited

U.S. PATENT DOCUMENTS

| | | | |
|---|---|---|---|
| 4,920,334 | 4/1990 | DeVolpi | 340/427 |
| 5,270,681 | 12/1993 | Jack | 340/427 |
| 5,278,538 | 1/1994 | Ainsworth et al. | 340/427 |
| 5,373,282 | 12/1994 | Carter | 350/932.2 |
| 5,408,213 | 4/1995 | Ungarsohn | 340/427 |

*Primary Examiner*—Jeffery A. Hofsass
*Assistant Examiner*—Anh La
*Attorney, Agent, or Firm*—Fulbright & Jaworski L.L.P.

[57] ABSTRACT

The automated cycle storage system comprises:

a plurality of cycles (CY), each having a fastening region (ZA) for temporarily storing it, an identification means (P1, P2) containing an identifier associated in a one-to-one way with said cycle and an antitheft device (AV) firmly attached to the cycle and designed so as to prevent the cycle from being stolen during temporary use of the cycle by a user, this antitheft device being actuable by means of a removable key (CL) containing at least part of the identification means (P1), and at least one storage station (ST) comprising a number of storage locations (EMP) each capable of removably housing a cycle, a number of controllable automatic cycle-locking/ unlocking devices (CRH), each capable of engaging in said fastening region of a cycle, and read devices (LP1, LP2) capable of reading the identification means of the cycles housed in the storage locations.

19 Claims, 7 Drawing Sheets

AUTOMATED SYSTEM FOR STORING CYCLES, IN PARTICULAR BICYCLES

The invention relates to automatic cycle storage.

A cycle means here any two-wheeled, or possibly three-wheeled vehicle, driven by pushing with the feet or by a motor.

The invention applies advantageously, but not limitatively, to the storage of bicycles intended to be made available to users for temporary usage, in particular for their leisure.

One object of the invention is to propose an automated cycle storage system requiring a limited number of staff who ensure its operation and its management, while reducing the risk of fraud, theft and vandalism.

The object of the invention is also to carry out, using simple techniques and for an industrially reasonable cost, automatic tracking and identification of the cycles borrowed and of the corresponding users, while offering a user the possibility of optionally returning his bicycle to a point other than the one from which he had borrowed it.

As claimed, the invention therefore proposes an automated cycle storage system comprising a plurality of cycles, each having a fastening region for temporarily storing it, an identification means containing an identifier associated in a one-to-one way with said cycle and an antitheft device firmly attached to the cycle and designed so as to prevent the cycle from being stolen during temporary use of the cycle by the user. This antitheft device is actuable by means of a removable key containing at least part of the identification means. The system furthermore comprises at least one storage station comprising a number of storage locations each capable of removably housing a cycle. The storage station also comprises a number of controllable automatic cycle-locking/unlocking devices, each capable of engaging in said fastening region of a cycle, and read devices capable of reading the means of identification of the cycles housed in the storage locations.

The antitheft device arranged in this way on the cycle and actuable by a removable key makes it possible, for example by securing the cycle to a post while it is being temporarily used, to prevent theft of this cycle by a third party other than the user. Furthermore, the fact of incorporating in the key of the antitheft device at least part of the identification means gives the operator of the automated storage system the assurance that the user has indeed returned his cycle fitted with the antitheft device and with its key. Thus, this avoids the possibility, in particular, of a malicious user returning his cycle after having made a duplicate of the key of the antitheft device, were the key to contain no part of the identification means, in order to be able thereafter to remove it possibly during a subsequent use by another user.

The invention is therefore especially noteworthy in that the same means, namely the key of the antitheft device, provides both a cycle-identification function and an antitheft mechanical locking and unlocking function.

In a highly simplified version of the system according to the invention, the automatic cycle-locking/unlocking devices may, for example, be operated, with regard to unlocking, manually by the user by inserting a token or the like, or remotely, for example by radio waves, by an empowered person to whom the potential user of the cycle was made known. With regard to locking the cycle, this may be carried out automatically when the fastening region of the cycle comes into the immediate vicinity of the locking device. Better still, checking means may be provided which are connected to the devices for reading the cycle-identification means and are capable of delivering a control signal for locking the cycle after reading and checking the cycle identification means.

According to an even more improved variant of the invention, the system comprises a plurality of portable articles, for example smart cards, intended to be assigned to potential cycle users, each portable article containing identification information making it possible at least to identify the portable article. It may simply be a card identifier incorporated into the memory of the smart card. It is also possible advantageously to ensure that the identification information comprises a user identifier and an item of information about the validity of the card. The locking/unlocking devices are then each capable of locking a cycle in its storage location and of unlocking a cycle in response to locking and unlocking control signals. The station furthermore comprises interface means, for example smart-card readers, each capable of interfacing with a portable article. The system according to the invention therefore advantageously comprises checking means which are linked to the read devices, to the locking/unlocking devices and to the interface means. These checking means are capable, in the presence of a portable article engaging in an interface means, of checking the identification information contained in the portable article as well as the cycle identifier, so as optionally to deliver the corresponding unlocking control signal. These same checking means are moreover capable, upon return of a cycle to a storage location, of checking at least the cycle identifier so as optionally to deliver the locking control signal.

The fact of assigning portable articles, such as smart cards to potential cycle users allows, in particular because of the identification information contained in the portable article, better cycle-allocation tracking. Furthermore, the fact of making the unlocking control signal conditional on checking the identification information contained in the portable article and the cycle identifier allows better control of the users authorized to borrow a cycle. Likewise, the fact of making the delivery of the locking control signal, upon return of a cycle, conditional on prior checking, at least of the cycle identifier, makes it possible to ensure that the cycle has indeed been returned before terminating the user's liability.

In order in particular to ensure that the user returning a cycle is indeed the one who borrowed it, it is particularly advantageous for there also to be interfacing between the user's portable article and the read device associated with the storage location into which the user returns his cycle and for making the delivery, by the checking means, of the locking control signal conditional upon verifying not only the cycle identifier but also the identification information contained in the portable article.

According to another variant of the invention, the automated cycle storage system, comprises:

- a plurality of cycles each including an identification means containing an identifier associated in a one-to-one way with the cycle,
- a plurality of portable articles intended to be assigned to potential cycle users and each containing identification information making it possible at least to identify said portable article,
- at least one storage station having a number of storage locations each capable of removably housing a cycle, devices for reading the identification means of the cycles housed in the storage locations, automatic locking/unlocking devices each capable of locking a cycle in its storage location and of unlocking a cycle, in response to locking and unlocking control signals, and interface means each capable of interfacing with a portable article, and checking means which are linked to the read devices, to the locking/unlocking devices and to the interface means and are capable, in the presence of a portable article engaging in an interface means, of checking the identification information contained in the portable article and the cycle identifier, so as optionally to deliver the corresponding unlocking control signal and, in the case of delivery of the unlocking control signal, to disable the delivery of a subsequent unlocking control signal associated with this same portable article as long as the cycle being used has not been housed again in a storage location, these checking means being capable moreover, upon return of a cycle to a storage location, of checking at least the cycle identifier, of delivering the locking control signal and of lifting the disabling of the delivery of an unlocking control signal associated with this portable article.

This variant of the invention therefore makes it possible to produce a one-to-one relationship between a portable article and a cycle, only at the moment when the cycle is unlocked using the portable article. In other words, prior to unlocking a cycle, any portable article enables any cycle to be used. Likewise, this possibility, of being able to use any cycle by means of any portable article, is provided anew from the moment when the cycle which has been used with a specific portable article has been returned.

The invention is therefore noteworthy in that it avoids in particular the use of portable articles, such as smart cards, specifically dedicated a priori to particular cycles.

The invention therefore allows very great simplification of the technical means, making it possible to establish, at each use of a cycle, a one-to-one relationship between this cycle and a portable article. By way of indication, this one-to-one relationship may be created within a memory of the checking means, thereby making it possible in particular to use smart cards whose integrated circuit (chip) contains only one or a number of memory registers and has no microprocessor incorporating specific software enabling such a one-to-one relationship to be created within the card.

This being so, and whatever the variant of the invention, it is not excluded for the checking means to be able, at least in part, to be incorporated in the portable articles.

According to one advantageous embodiment of the invention, the checking means include a central memory containing all the cycle identifiers and all the identification information contained in the portable articles. The checking means then include processing means capable of constructing a look-up table between each unlocked-cycle identifier and the identification information contained in the portable article which has allowed the unlocking. The processing means are then capable of disabling the delivery of a subsequent unlocking control signal associated with this same portable article as long as the identification information contained in this portable article appear in said look-up table. These checking means are capable of lifting said disabling of the delivery of an unlocking control signal associated with this portable article by removing the identification information contained in this portable article from the look-up table.

The combination of disabling the delivery of a subsequent unlocking control signal associated with a portable article, with the characteristic of an antitheft key containing at least part of the cycle identification means, allows identification and tracking, security-wise, of the cycles borrowed with maximum antifraud and antitheft guarantees.

The processing means are advantageously furthermore capable of disabling the delivery of an unlocking control signal when there is an additional condition, other than that associated with the contents of said look-up table. In fact, in certain specific circumstances, a bicycle cannot be released from the storage station although the portable article, for example the smart card, authorizes such a release. Thus, the checking means may, for example, confine the bicycle to its storage location, in particular by remote control, for maintenance reasons, such as for changing a chain for example. Likewise, a bicycle can be confined because of a reservation (for example by telephone or through the Internet network) by a user. It is also possible to disable the unlocking control signal associated with a portable article if it has been stated that the latter has, for example, been stolen.

When the cycle is stored in a storage location, the means of identification of each cycle is preferably arranged at least partially in a housing inaccessible to a user. This makes it possible, especially when the key of the antitheft device includes at least part of the identification means, to further minimize any attempt to defraud when the cycle is stored in its location.

Thus, according to one embodiment of the invention, the storage station includes boxes associated respectively with the storage locations, each box incorporating a housing inaccessible to a user, which is capable of housing, at least partially, the means of identification of a cycle, a device for reading the cycle identification means, a locking/unlocking means and, when the invention so provides, a means for interfacing with a portable article. Thus, the following may be grouped together within the same box, thereby making technical realization easier, on the one hand the functions of reading the identification means, the functions of locking/unlocking and, optionally, the functions of interfacing with the portable article, and on the other hand the housing inaccessible to the user.

When each portable article is a smart card, for example a chip card, the interface means then includes a conventional smart-card reader.

Although the means of identification of a cycle can be entirely located in the key of the antitheft device, it is preferable for the means of identification of a cycle to have two separate elements, respectively arranged at two separate points on the cycle, each element containing at least part of the cycle identifier.

Such an embodiment enables the risks of fraud to be further minimized. This is because, in particular when the second element of the identification means is incorporated in the cycle frame, it is thus guaranteed, when the cycle is returned to its storage location and the cycle identifier is checked on the basis of the contents of the two separate elements, that not only is the antitheft device returned but that the rest of the cycle is also returned. Such an embodiment makes it possible to avoid the situation, in which the cycle has only an identification means entirely incorporated in the key of the antitheft device, whereby a malicious user removes the key of the antitheft device, keeps the cycle and presents just the key in front of the corresponding read device so as to simulate return of the cycle.

In order to simplify the mechanical construction of the invention, the two separate elements of the means of identification of a cycle are arranged on the cycle so as to be both housed in the inaccessible housing of the box. Thus, the two separate elements of the identification means will advantageously be placed near each other. Of course, the read device in the box then has two read means capable of interfacing respectively with the two separate elements of the identification means.

Of course, when the means of identification of a cycle is entirely formed by a single element incorporated, for example, in the key of the antitheft device, the cycle identifier is entirely contained in this identification means. When at least two separate elements are provided for the identification means, each separate element may be designed so as to contain the complete cycle identifier or part of the identifier, or else a combination of the above two approaches.

Although the means of identification of a cycle may be realized in different ways, for example by means of a bar code or of a specific marking, it is particularly advantageous, especially in order to minimize the risks of fraud, to ensure that the means of identification of a cycle includes at least one integrated circuit (electronic chip) having a memory containing at least part of the cycle identifier. In this case, the corresponding read device includes an interface-circuit capable of interfacing with the integrated circuit. In a simplified embodiment, the single element of the identification means, or the separate elements of the latter, may thus include an electronic chip embedded in the cycle (antitheft device and/or frame, for example), the chip being linked simply to two external metal contacts which are flush with the surface of the cycle and are intended to interface with two equivalent contacts of the corresponding read means. Such an embodiment avoids having to use, although this is possible, non-contacting means of reading the electronic chips, for example by providing modulation by absorption of the waves emitted by the read means.

The system according to the invention may comprise a number of storage stations, at least two, and the checking means are then located, at least partially, outside the storage stations, in particular with regard to the processing means and the central memory. More specifically, the checking means may include, within each storage station, a connection terminal connected to all the locking/unlocking devices, to all the devices for reading the means of identification of the cycles housed in the storage locations and to all the interface means of the storage station. All the connection terminals are then connected to the processing means and to the central memory. In this way, the operation of the system, enabling a user to borrow a cycle at one storage location of a storage station and to return it either to this same location or to another location in the storage station, or else to another storage station, is tracked centrally.

More generally, the subject of the invention is also a procedure for the automated storage of cycles each having an identification means containing an identifier associated in a one-to-one way with said cycle and an antitheft device firmly attached to the cycle and designed so as to prevent the cycle from being stolen during temporary use of the cycle by a user. This antitheft device is actuable by means of a removable key containing at least part of the identification means. According to this procedure, the contents of the means of identification of a cycle are read at a storage location of at least one storage station intended to house the cycle and the cycle is automatically locked, or not, in this storage location depending on the result of said reading.

When portable articles are assigned to potential cycle users, each portable article containing identification information identifying at least said portable article, a cycle is advantageously unlocked after having read the cycle identifier and the identification information contained in a portable article, and a cycle is locked after having checked the cycle identifier and the identification information contained in the portable article which has allowed it to be unlocked.

As a variant, the subject of the invention is a procedure for the automated storage of cycles each having an identification means containing an identifier associated in a one-to-one way with said cycle. According to this procedure, portable articles are assigned to potential cycle users, each portable article containing identification information identifying at least said portable article, a cycle is unlocked after having read the cycle identifier and the identification information contained in a portable article and, in the case of unlocking the cycle, subsequent unlocking of a cycle associated with this same portable article is prohibited as long as the cycle being used has not been locked again in a storage location and, upon return of a cycle to a storage location, at least the cycle identifier, and preferably also the identification information contained in the corresponding portable article, are checked, the cycle is locked, or not, depending on the result of this check and the unlocking prohibition associated with this portable article is lifted.

The subject of the invention is also a cycle having a fastening region for its temporary storage, an identification means containing an identifier associated in a one-to-one way with said cycle and an antitheft device firmly attached to the cycle and designed so as to prevent the cycle from being stolen during temporary use of the cycle by a user, this antitheft device being actuable by means of a removable key containing at least part of the identification means.

Such a cycle may advantageously include at least one of the characteristics of the invention which have been mentioned above.

Further advantages and characteristics of the invention will appear on examining the detailed description of embodiments and of methods of implementation, these being entirely nonlimiting, and of the appended drawings in which.

Figure 7:
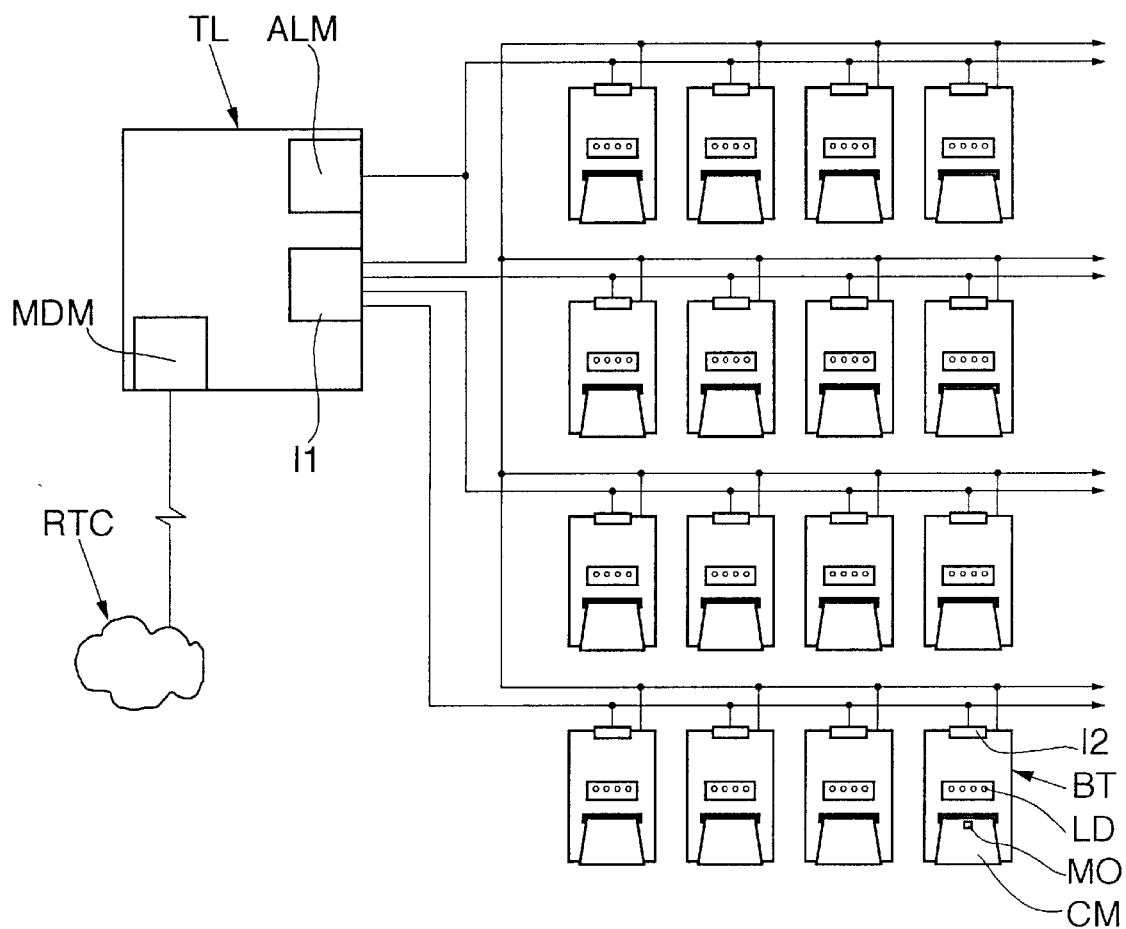
Figure 8:
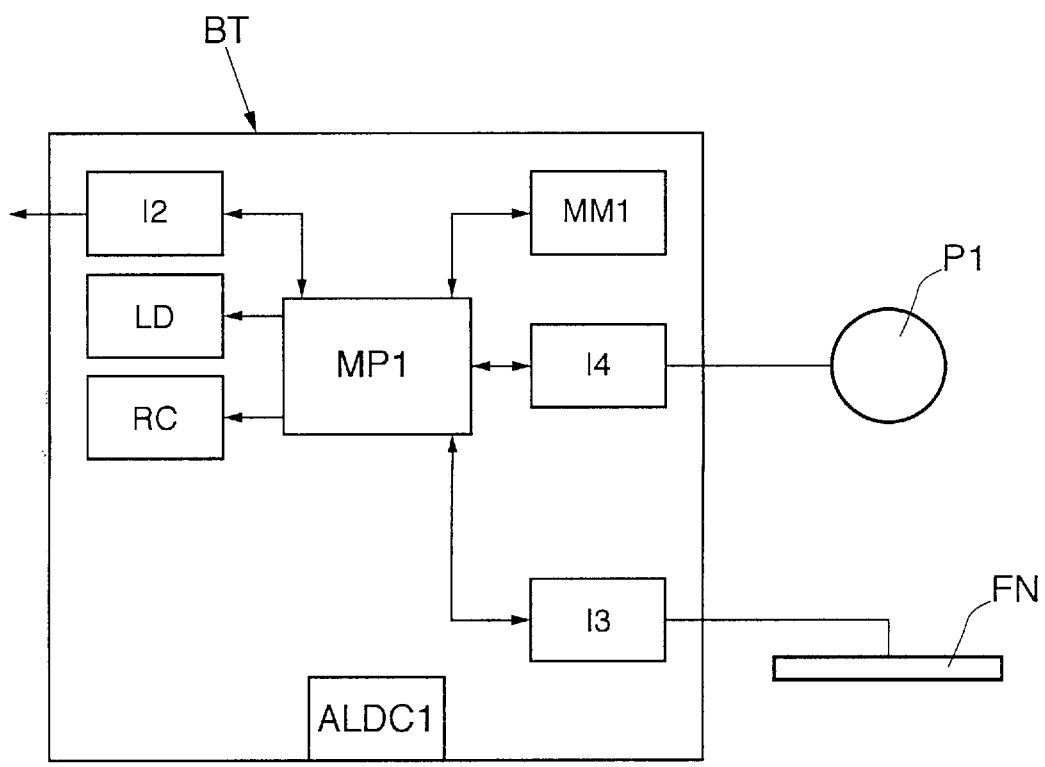
Figure 9:
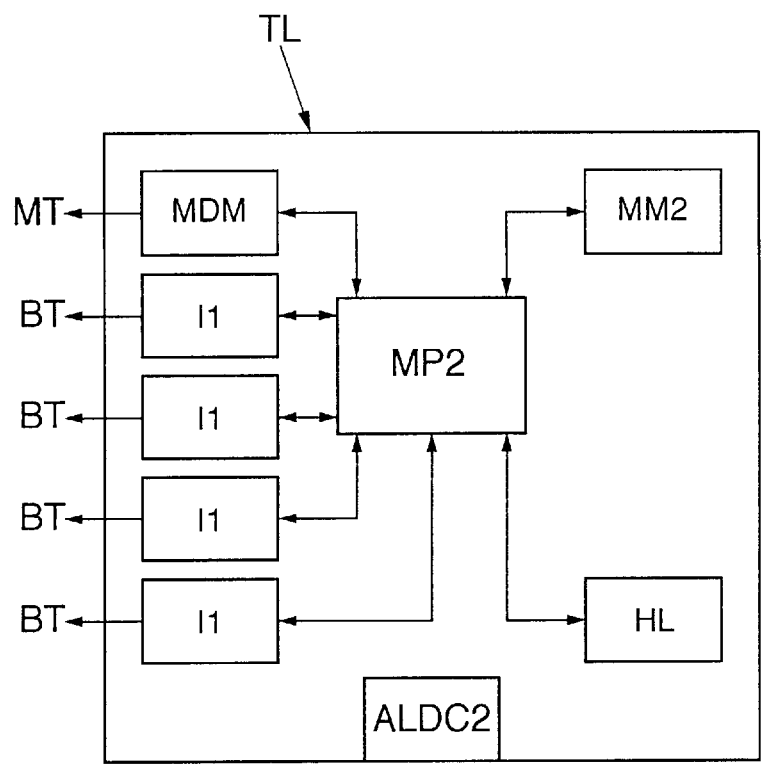

FIGS. 3 to 6 diagrammatically illustrate in more detail the characteristics of a cycle as well as the means enabling it to be automatically stored in a storage station;

FIG. 7 illustrates in a diagrammatic way, and in more detail, the general architecture of a storage station;

FIG. 8 is a schematic block diagram of the electronic architecture of a box enabling in particular a cycle to be locked and unlocked at a storage location; and FIG. 9 is a schematic block diagram of the electronic architecture of a connection terminal of a storage station.

Figure 1:
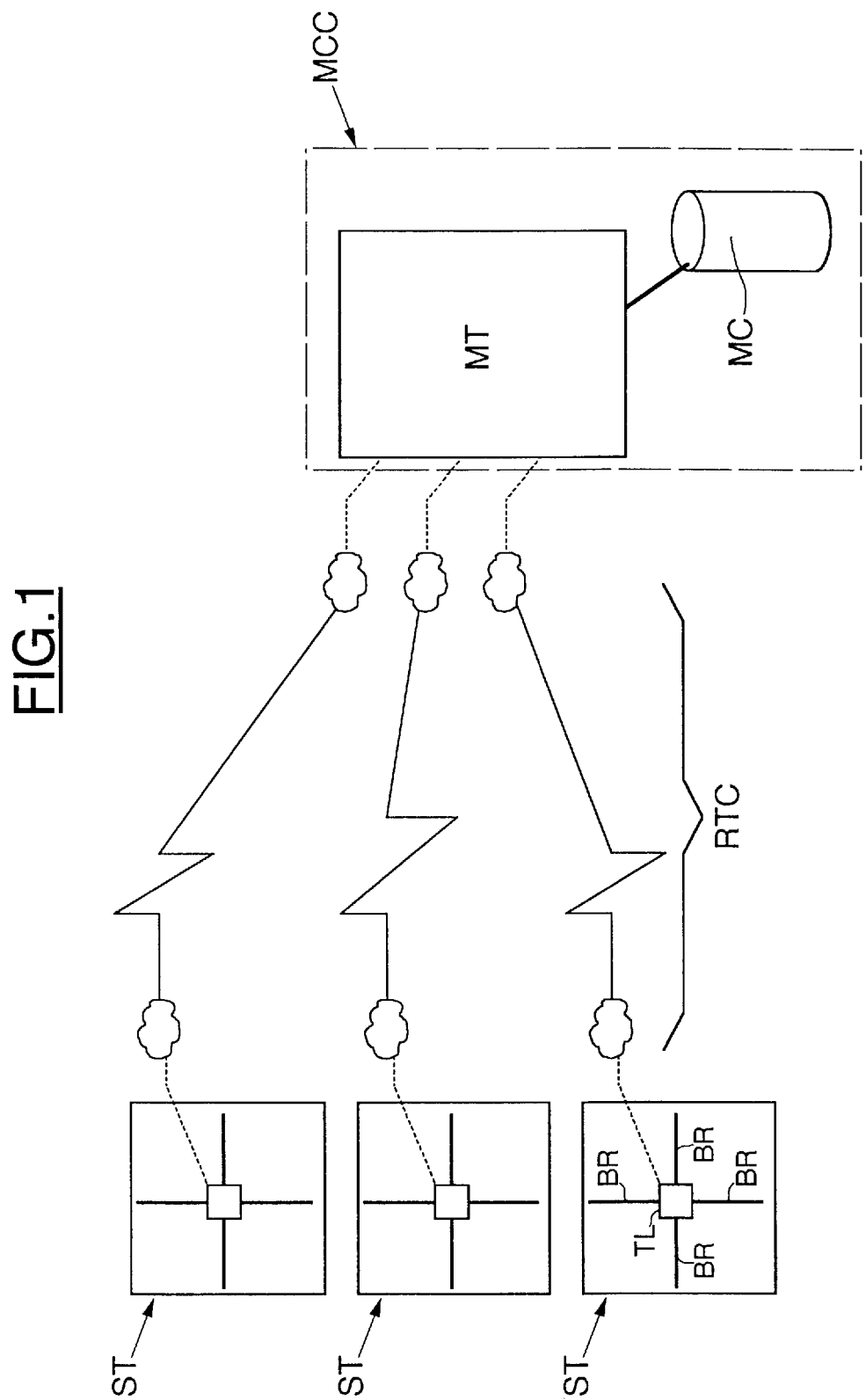
FIG. 1 is a highly schematic block diagram of a cycle storage system according to the invention.

As illustrated in FIG. 1, the system includes centralized control means MCC which incorporate a central computer containing processing means MT, essentially produced in software form, and a central (file) memory MC.

The computer MT is linked, for example, by means of a telephone network RTC to a number of storage stations ST, only three of which are shown in this figure for the sake of simplification. As will be seen in more detail below, the checking means of the system (which are also essentially produced in software form) include, centralized within each storage station, a connection terminal TL linked to the central computer MT. Moreover, the station ST includes means enabling the bicycles to be housed and shown here diagrammatically in this example in the form of four bars BR.

These various storage stations may be installed within the same town so as to allow potential users to borrow cycles, for them occasionally to move about the town and/or for them to pursue leisure activities, and to return them to the same point or to different storage stations.

Figure 2:
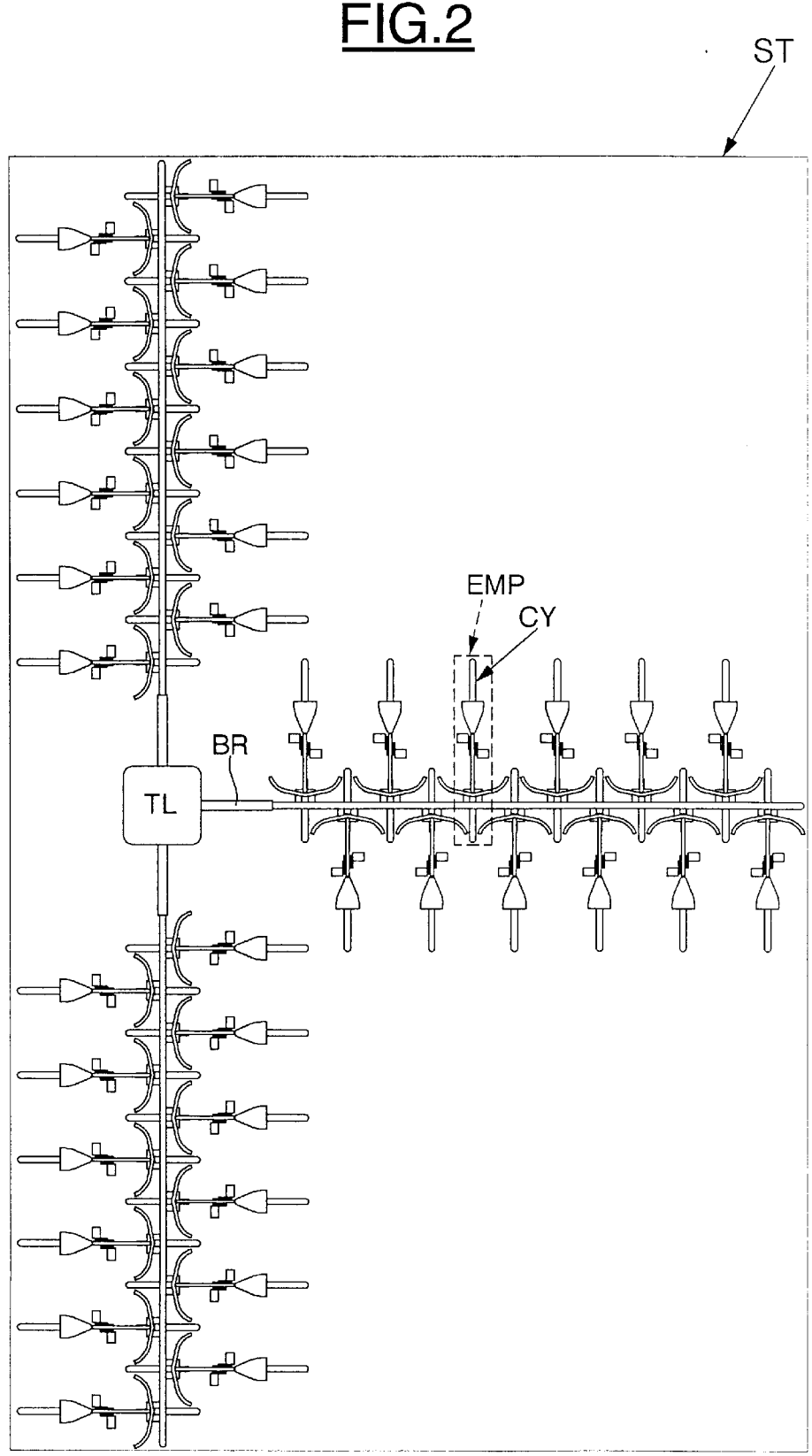
FIG. 2 illustrates in more detail a cycle storage station.
Figure 3:
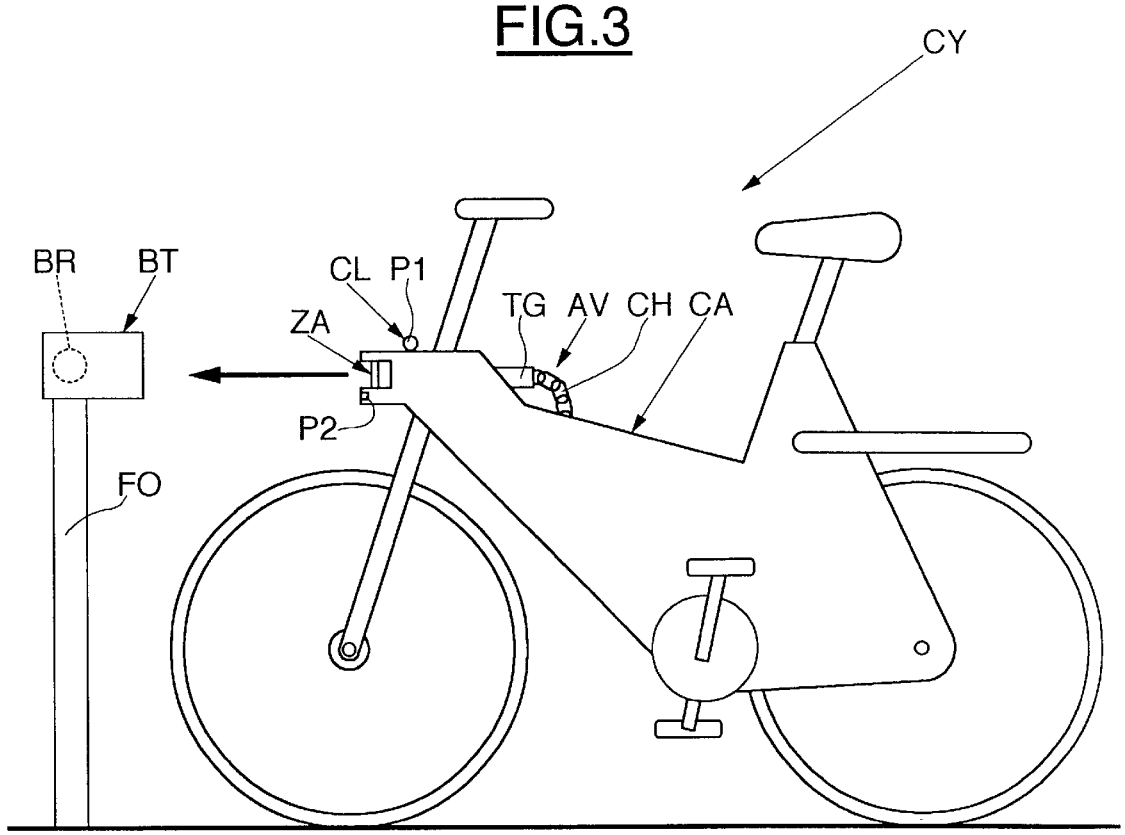
Figure 4:
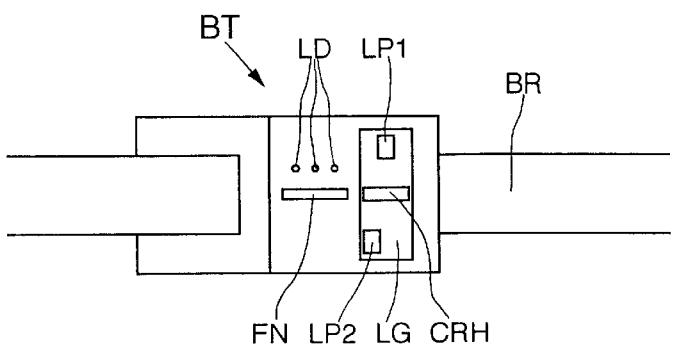
Figure 5:
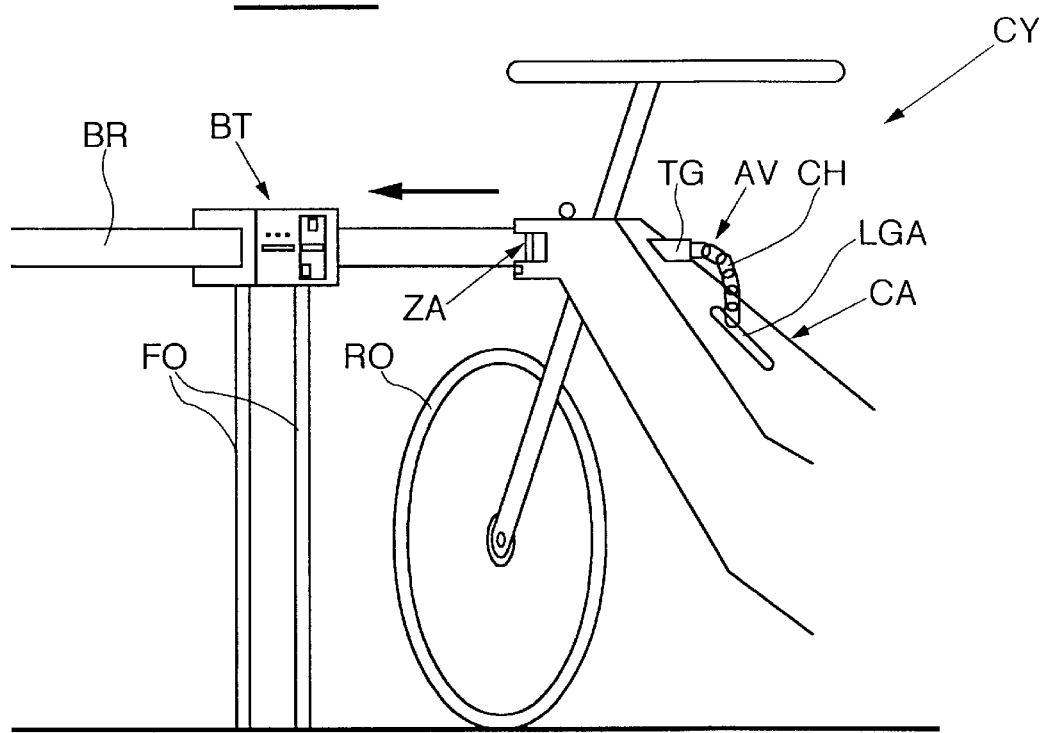

Specifically, as illustrated in particular in FIG. 2, a storage station is linked together around a central unit containing a connection terminal TL, the structure and function of which will be described in more detail below and from which a number of bars BR for fixing the cycles CY emanate. Provided on each bar BR are means for fastening the cycles, these defining a storage location EMP for the cycle. These fastening means are, for example, incorporated within a box BT (FIGS. 3 to 6) solidly fixed, on the one hand, to the bar BR and, on the other hand, to the ground by means of two vertical rods FO forming a fork for housing the front wheel of the cycle and keeping the latter vertical.

A storage station occupying a rectangular area of 7.5 meters×12.5 meters thus enables thirty-six bicycles to be stored, these being distributed, for example, with twelve bicycles per bar.

As illustrated more particularly in FIGS. 3 to 6, a cycle CY has a frame CA containing an advantageously tamper-proof housing LGA inside which is solidly fixed the flexible element CH (here, a chain) of a cycle antitheft device AV. The other end of the chain CH is connected to a rod TG embedded in the front part of the frame and able to be locked and unlocked by means of a removable key CL. Thus, when a user having borrowed a cycle wishes to park it temporarily so as to prevent it from being stolen, he unlocks the rod TG of the antitheft device AV by means of the key, extracts that part of the chain which lies in the housing LGA, passes this chain around, for example, a post and relocks the rod TG of the antitheft device in the front part of the frame by means of the key.

The front end of the frame CA of the cycle CY also includes a fastening region ZA formed here by a rod extending between two horizontal legs and intended to engage in a locking/unlocking device placed in the box BT. More precisely, this locking/unlocking device includes an electromagnetically controllable hook CRH incorporated in a housing LG in the box BT and intended to be fastened onto the rod of the fastening region ZA of the cycle.

In order to identify a cycle in a one-to-one way, it is intended to equip the latter with an identification means having, here, two separate elements formed by two integrated circuits (electronic chips) P1 and P2 incorporated respectively, on the one hand, in the key CL of the antitheft device and, on the other hand, in the frame, more specifically near the key of the antitheft device, for example in the fastening region ZA.

The memory of each of the chips P1 and P2 contains a complete cycle identifier (for example, a serial number). These chips are incorporated invisibly in the key and in the frame, and each is simply linked to two metal contacts which are flush with the outside of the key and with the outside of the frame so as to be able to interface with equivalent metal contacts on two read means LP1 and LP2, both these being located inside the housing LG in the box BT.

Figure 6:
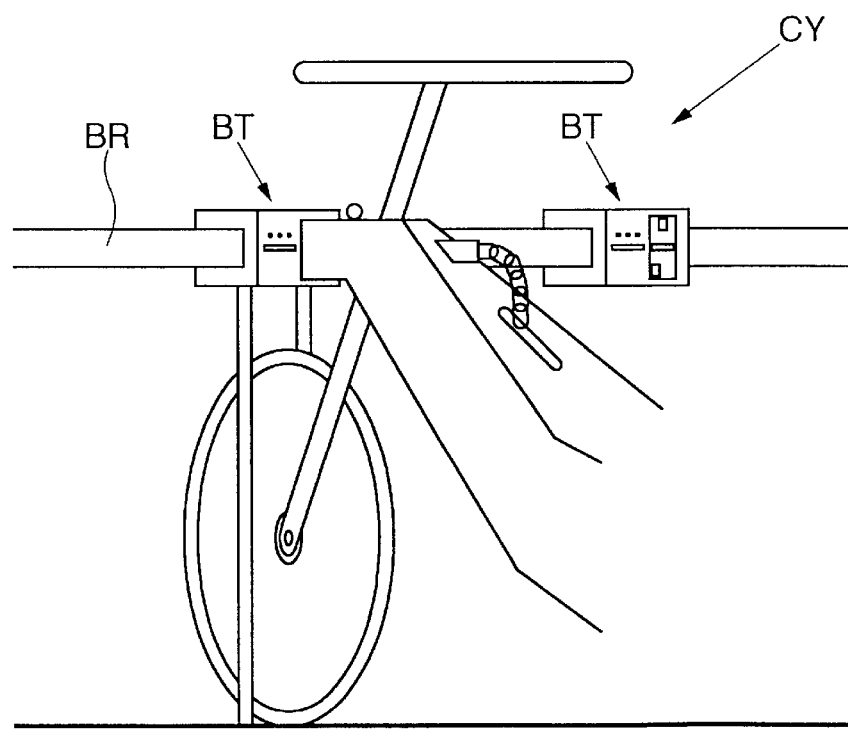

Those skilled in the art will notice, in particular in FIG. 6, that when the cycle is locked in the housing LG in the box, this housing and, consequently, the two elements making up the cycle identification means (the key CL and that part of the frame containing the chip P2) are inaccessible to a user except when, of course, the latter unlocks a cycle by means of a smart card, as will be seen in more detail later.

In this regard, one of the faces of the box has a slot FN capable of receiving such a smart card, as well as light-emitting diodes LD intended, as will be seen later, to inform the user visually, by means of green or red colors, that unlocking of the cycle is allowed or prohibited.

Shown schematically in FIG. 7 are essentially the boxes BT interfacing with a smart card CM and linked via a digital interface I2 of the RS422 type to a corresponding interface I1 of the connection terminal TL of the storage station. Likewise, a supply unit ALM of the connection terminal supplies the boxes BT with DC current.

In order to be able to interface with the memory MO in the smart card, for example an electronic chip, the box incorporates a conventional chip-card reader having, for example as illustrated in FIG. 8, a specific interface I3 linked to an 8-bit microprocessor MP1.

The memory MO in the card contains identification information which includes, in particular, an identifier which identifies the card but also, preferably, an identifier which identifies the user to whom this card has been assigned, as well as, optionally, information indicating the maximum period of use of this card by the user. In fact, the identification information, other than the card identifier proper, could just be stored directly in the central file MC of the central computer in correspondence with the card identifier also stored in this file.

The internal electronic architecture of the box BT is, as illustrated in FIG. 8, linked together around the 8-bit microprocessor MP1. The RS422-type interface I2, the light-emitting diodes LD and the control relays RC, enabling the electromagnetic cycle-locking hooks to be activated, are linked to this microprocessor MP1.

The reader of the chips (P1 for example) for identifying the cycle is partially produced in software form within the microprocessor MP1 and also incorporates the interface I4 intended to interface with the metal contacts on the corresponding chip, this interface I4 being linked to the microprocessor MP1.

Finally, a memory unit MM1 is conventionally linked to this microprocessor MP1, said memory unit containing, for example, 32 kbytes of RAM and 128 kbytes of nonvolatile memory. A supply unit ALDC1 delivers the various supply voltages for the various components in this box BT.

The internal electronic architecture of the connection terminal TL is, as illustrated in FIG. 9, architectured around a 32-bit microprocessor MP2 linked to a modem MDM which itself is linked, via the switched telephone network RTC, to the central computer MT. All the RS422-type interfaces I1, respectively connected to groups of boxes, are also linked to the microprocessor MP2. A clock HL indicating the current time, as well as a supply unit ALDC2 delivering the various supply voltages to the various components in the terminal TL, are also provided. Finally, a memory unit MM2 is conventionally linked to the microprocessor MP2 and contains, for example, 1 Mbyte of dynamic RAM, 128 kbytes of RAM and 128 kbytes of ROM.

The operation of the system according to the invention will now be described in more detail.

When a user wishes to be able to use the cycle storage system according to the invention, a smart card CM is assigned to him. The processing means of the central computer then identify this potential user by means of a user identifier which is stored in the central file MC in correspondence with the card identifier of the smart card which was assigned to him. This user identifier may also be directly stored in the memory MO of the smart card. It is also possible to associate with this user and with this card validity information indicating, for example, the expiry date of the card. This validity information is stored in the central file in correspondence with the card identifier and with the user identifier, but it may also be stored in the memory MO of the smart card.

The central file MC of the checking means also contains all the cycle identifiers.

When this user envisages borrowing a cycle, he goes to a storage station and inserts his smart card into the box BT. From that moment on, the corresponding cycle identifier and the identification information contained in the card are transferred via the corresponding means in the box, and the connection terminal, to the central computer MT which, if nothing prevents this, as will be seen in more detail later, delivers an authorization to unlock the cycle, this being manifested by the emission of a control signal at the relays of the electromagnetic hooks in the box. A green light on the box then comes on, the cycle is unlocked and the user may use it. The unlocking time is also stored in the central file.

At the same time as this unlocking authorization provided by the checking means, the latter then prohibit subsequent unlocking of a cycle using this same smart card as long as the previous cycle has not been returned. To do this, the checking means may, for example, create, within the central file, a look-up table giving the correspondence between the smart-card identifier which has allowed a cycle to be unlocked and the cycle identifier thus unlocked. Until the cycle has been returned to any storage location in any storage station, the card identifier will appear in this look-up table and will be unable to allow subsequent cycle unlocking to take place.

When the user returns his cycle to any storage location in any storage station, he positions the fastening region ZA of his cycle in the housing LG in the corresponding box and inserts his smart card into the slot in the corresponding reader. The box BT and the connection terminal TL then send to the central computer the identifier identifying the cycle returned as well as the identification information contained in the smart card. The central computer then confirms, on the one hand, that the cycle has indeed been returned in its entirety (antitheft device+frame) and also confirms that the identifier of the cycle returned does indeed correspond to the identifier of the card which has allowed it to be unlocked. If this is so, a locking instruction is then sent to the box which automatically locks the cycle. Simultaneously, the smart-card identifier is erased from the look-up table, thereby consequently allowing another cycle to be unlocked again using this smart card. The locking time is also recorded.

Having done this, the central computer may prohibit unlocking of a cycle for another reason. This is because such a cycle may, for example, have been reserved by a specific user, whilst some of the cycles may require slight maintenance, such as the replacement of a chain or the replacement of a tire, or else certain smart cards may have been stolen.

In this case, provision is advantageously made for the boxes BT to be also assigned a box identifier, for example stored in the memory associated with the microprocessor MP1. All the box identifiers are also stored in the central file MC of the central computer. Since all the cycle identifiers are also stored in the central file and since the central computer always knows the identifiers of the locked cycles, a correspondence between certain of the cycles which must not be unlocked and the corresponding boxes BT may be very readily established by means of software.

I claim:

1. Automated cycle storage system, comprising:
   a plurality of cycles (CY), each having a fastening region (ZA) for temporarily storing it, an identification means (P1,P2) containing an identifier associated in a one-to-one way with said cycle and an antitheft device (AV) firmly attached to the cycle and designed so as to prevent the cycle from being stolen during temporary use of the cycle by a user, this anti-theft device being actuable by means of a removable key (CL) containing at least part of the identification means (P1), and
   at least one storage station (ST) comprising a number of storage locations (EMP) each capable of removably housing a cycle, a number of controllable automatic cycle-locking/unlocking devices (CRH), each capable of engaging in said fastening region of a cycle, and read devices (LP1, LP2) capable of reading the identification means of the cycles housed in the storage locations.

2. System according to claim 1, characterized in that it comprises a plurality of portable articles (CM) intended to be assigned to potential cycle users and each containing identification information making it possible at least to identify said portable article, in that the locking/unlocking devices are each capable of locking a cycle in its storage location and of unlocking a cycle in response to locking and unlocking control signals, in that the station (ST) furthermore comprises interface means (I3, FN) each capable of interfacing with a portable article and in that the system comprises checking means (TL, MC) which are linked to the read devices, to the locking/unlocking devices and to the interface means and are capable, in the presence of a portable article engaging in an interface means, of checking the identification information contained in the portable article and the cycle identifier, so as optionally to deliver the corresponding unlocking control signal, and are capable, upon return of a cycle to a storage location, of checking the cycle identifier so as optionally to deliver the locking control signal.

3. System according to claim 2, characterized in that the checking means include a central memory (MC) containing all the cycle identifiers and all the identification information contained in the portable articles and in that the control means include processing means (MT) capable of constructing a look-up table between each unlocked-cycle identifier and the identification information contained in the portable article which has allowed the unlocking, of disabling the delivery of a subsequent unlocking control signal associated with this same portable article as long as the identification information contained in this portable article appears in said look-up table and in removing said disabling of delivery of an unlocking control signal associated with this portable article by removing the identification information contained in this portable article from said look-up table.

4. System according to claim 3, characterized in that the processing means (MT) are capable of disabling the delivery of an unlocking control signal when there is an additional condition, other than that associated with the contents of said look-up table.

5. System according to claim 2, characterized in that the storage station (ST) includes boxes (BT) associated respectively with the storage locations, each box incorporating a housing (LG) inaccessible to a user, which is capable of housing, at least partially, the means of identification of a cycle, a device for reading the cycle identification means, a locking/unlocking means and a means for interfacing with a portable article.

6. System according to claim 5, characterized in that the means of identification of a cycle has two separate elements (P1, P2) respectively arranged at two separate points on the cycle, each element containing at least part of the cycle identifier.

7. System according to claim 6, characterized in that the first element (P1) of the identification means is incorporated in the key (CL) of the antitheft device and the second element (P2) of the identification means is incorporated in the cycle frame.

8. System according to claim 6, characterized in that the two separate elements of the means of identification of a cycle are arranged on the cycle so as to be both housed in the inaccessible housing (LG) of the box (BT), the read device in the box having two read means (LP1, LP2) capable of interfacing respectively with the two separate elements of the identification means.

9. System according to claim 2, characterized in that each portable article is a smart card (CM) and in that each interface means includes a smart card reader.

10. System according to claim 1 characterized in that the antitheft device includes a flexible element (CH), one end of which is solidly fixed to one part of the cycle and the other end (TG) of which is fixed to another part of the cycle so as to be removable by means of a key.

11. System according to claim 1, characterized in that the means of identification of the cycle includes at least one integrated circuit having a memory containing at least part of the cycle identifier and in that the corresponding read device includes an interface-circuit (I3) capable of interfacing with the integrated circuit.

12. System according to claim 1, characterized in that it comprises a number of storage stations (ST) and in that the processing means and the central memory of the checking means are located, at least partially, outside the storage stations.

13. System according to claim 12, characterized in that the checking means include, within each storage station, a connection terminal (TL) connected to all the locking/unlocking devices, to all the devices for reading the means of identification of the cycles housed in the storage locations and to all the interface means of the storage station and in that all the connection terminals are connected to the processing means and to the central memory.

14. Automated cycle storage system, comprising:
- a plurality of cycles (CY) each including an identification means (P1, P2) containing an identifier associated in a one-to-one way with said cycle,
- a plurality of portable articles (CM) intended to be assigned to potential cycle users and each containing identification information making it possible at least to identify said portable article,
- at least one storage station (ST) having a number of storage locations (EMP) each capable of removably housing a cycle, devices for reading the identification means of the cycles housed in the storage locations, automatic locking/unlocking devices each capable of locking a cycle in its storage location and of unlocking a cycle, in response to locking and un locking control signals, and interface means each capable of interfacing with a portable article, and
- checking means (MT, TL) which are linked to the read devices, to the locking/unlocking devices and to the interface means and are capable, in the presence of a portable article engaging in an interface means, of checking the identification information contained in the portable article and the cycle identifier, so as optionally to deliver the corresponding unlocking control signal and, in the case of delivery of the unlocking control signal, to disable the delivery of a subsequent unlocking control signal associated with this same portable article as long as the cycle being used has not been housed again in a storage location, and are capable, upon return of a cycle to a storage location, of checking at least the cycle identifier, of delivering the locking control signal and of lifting the disabling of the delivery of an unlocking control signal associated with this portable article.

15. System according to claim 14, characterized in that each cycle (CY) is fitted with an antitheft device (AV) firmly attached to the cycle and designed so as to prevent the cycle from being stolen during temporary use of the cycle by a user, this antitheft device being actuable by means of a removable key (CL) containing at least part of the identification means (P1).

16. Procedure for the automated storage of cycles, each having an identification means containing an identifier associated in a one-to-one way with said cycle (CY) and an antitheft device (AV) firmly attached to the cycle and designed so as to prevent the cycle from being stolen during temporary use of the cycle by a user, this anti-theft device being actuable by means of a removable key (CL) containing at least part (P1) of the identification means, in which procedure the contents of the means of identification of a cycle (CY) are read at a storage location (EMP) of at least one storage station (ST) intended to house the cycle, and the cycle is automatically locked, or not, in this storage location depending on the result of said reading.

17. Procedure according to claim 16, characterized in that portable articles (CM) are assigned to potential cycle users, each portable article containing identification information identifying at least said portable article, a cycle (CY) is unlocked after having read the cycle identifier and the identification information contained in a portable article, and a cycle is locked after having checked the cycle identifier and the identification information contained in the portable article having allowed it to be unlocked.

18. Procedure for the automated storage of cycles, each having an identification means containing an identifier associated in a one-to-one way with said cycle (CY), in which procedure portable articles (CM) are assigned to potential cycle users, each portable article containing identification information identifying at least said portable article, a cycle is unlocked after having read the cycle identifier and the identification information contained in a portable article and, in the case of unlocking of the cycle, subsequent unlocking of a cycle associated with this same portable article is prohibited as long as the cycle being used has not been locked again in a storage location (EMP) and, upon return of a cycle to a storage location, at least the cycle identifier is checked, the cycle is locked, or not, depending on the result of this check and the unlocking prohibition associated with this portable article is removed.

19. Cycle having a fastening region (ZA) for temporary storage of the cycle, and identification means (P1, P2) containing an identifier associated in a one-to-one way with said cycle and an antitheft device (AV) firmly attached to the cycle and designed so as to prevent the cycle from being stolen during temporary use of the cycle by a user, this antitheft device being actuable by means of a removable key (CL) containing at least part (P1) of the identification means.

* * * * *